United States Patent
Handa et al.

(10) Patent No.: US 6,831,250 B2
(45) Date of Patent: Dec. 14, 2004

(54) METHOD FOR CALCULATING SHAPE OF BEAD OF WELDED PART

(75) Inventors: Hiroyuki Handa, Kitakyushu (JP); Takeshi Okamoto, Kitakyushu (JP); Keiichi Takaoka, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 10/169,754
(22) PCT Filed: Jan. 17, 2001
(86) PCT No.: PCT/JP01/00281
§ 371 (c)(1), (2), (4) Date: Jul. 18, 2002
(87) PCT Pub. No.: WO01/53029
PCT Pub. Date: Jul. 26, 2001

(65) Prior Publication Data
US 2003/0010764 A1 Jan. 16, 2003

(30) Foreign Application Priority Data
Jan. 18, 2000 (JP) .................................. 2000-009491

(51) Int. Cl.⁷ .............................................. B23K 9/095
(52) U.S. Cl. ................................ 219/137 PS; 219/130.5
(58) Field of Search ..................... 219/130.01, 130.21, 219/137 PS, 130.5; 228/103

(56) References Cited

U.S. PATENT DOCUMENTS 4,920,249 A * 4/1990 McLaughlin et al. .. 219/130.21
6,024,273 A * 2/2000 Ludewig et al. ............ 228/103

FOREIGN PATENT DOCUMENTS

| JP | 63-8687 | 1/1988 |
| JP | 63-84776 | 4/1988 |
| JP | 6-126453 | 5/1994 |
| JP | 7-214317 | 8/1995 |

OTHER PUBLICATIONS

IBM Technical Disclosure Bulletin—vol. 37, No. 04B, pp. 151–152, Apr. 1994.

* cited by examiner

Primary Examiner—Kiley Stoner
Assistant Examiner—Kevin P. Kerns
(74) Attorney, Agent, or Firm—Westerman, Hattori, Daniels, & Adrian, LLP

(57) ABSTRACT

A method for calculating the shape of a bead of a welded part by solving the problem of multiple solutions when the shape causing a recess or undercut in the flange is determined by calculation. The geometry data on the object to be welded, the characteristic parameters of the object and welding environment, and the welding conditions are set. Under the welding conditions, the melting part of the object is inferred by heat conduction calculation. The coordinates are rotated about an axis parallel to the direction of the welding and/or about an axis perpendicular to the welding direction for the inferred melting part. A difference lattice is set for the coordinate-rotated melting part. The displacement of the melting part for which the difference lattice is set is calculated by a curved surface equation.

8 Claims, 10 Drawing Sheets

METHOD FOR CALCULATING SHAPE OF BEAD OF WELDED PART

TECHNICAL FIELD

The present invention relates to a method for accurately calculating numerical values for a bead shape in arc welding.

BACKGROUND ART

Arc welding is a junction technique wherein a plurality of independent welding workpieces are partially melted by high-temperature heat generated by arc discharge and the molten metal solidifies, thereby joining the welding workpieces. This arc welding is broadly divided into two methods: a non-consumable electrode-type arc welding method wherein an arc is generated by a non-consumable electrode and a bead is formed only of molten metal of welding workpieces, and a consumable electrode-type arc welding method wherein filler metal made of a material of the same type as that of welding workpieces and the welding workpieces are melted by arc heat, and the molten filler metal and melted welding workpieces are mixed, thereby forming a bead shape.

Welding quality resulting from this arc welding depends on various factors (welding conditions) including the material of welding workpieces, the shape of a joint, the material of filling metal, components of shielding gas for shielding an arc and a welded part from the atmospheric air, the board thickness of welding workpieces, the welding position, welding current, welding voltage, and welding speed, therefore, priorly, it has been possible for only skilled workers who have acquired experience over a long period of time to set the above welding conditions.

For the purpose of solving this problem, Japanese Unexamined Patent Publication No. Hei-7-214317 and Japanese Unexamined Patent Publication No. Hei-6-214317 have been provided. In Japanese Unexamined Patent Publication No. Hei-7-214317, the shape of a weld bead is made approximate to the area of a half ellipse. In addition, in Japanese Unexamined Patent Publication No. Hei-6-126453, the shape of a bead in a case of fillet welding is calculated in accordance with [Numerical formula 1].

[Numerical formula 1].

$$\frac{dx}{dy} = \frac{f(y)}{\sqrt{1-f^2(y)}}$$

$$f(y) = \frac{\rho g}{2\sigma}y^2 - \frac{1}{R_0}y - \sin\alpha$$

Herein, $\rho$ represents density of molten metal, g represents acceleration of gravity, $\sigma$ represents surface tension of molten metal, and x, y, a, and $R_0$ represent, in terms of coordinate axes x and y, an angle a between the tangent line of a bead shape and a curvature $R_0$ of the y-axis.

However, with the prior method for setting welding conditions by a skilled worker, it had been necessary even for a skilled worker, in order to set welding conditions to secure the welding quality demanded, to repeatedly make adjustments by use of multiple test materials until appropriate conditions could be obtained in advance, moreover, it had been impossible to infer what the shape of a weld bead after welding would be like.

There have been no means for confirmation of this weld bead shape but to judge, by cutting a welded part of welding workpieces, sufficiently polishing the sectional welded part, and performing etching with a corrosive liquid, as to whether appropriate welding results have been obtained.

In addition, with the method of Japanese Unexamined Patent Publication No. Hei-7-214317, wherein a bead shape is made approximate to the area of a half ellipse, an accurate bead shape cannot be obtained, and particularly, in a case of fillet welding as shown in FIG. 1, a bead shape cannot be made approximate to the area of a half ellipse, therefore, a problem has existed such that a highly accurate weld bead shape cannot be obtained by calculation, and in Japanese Unexamined Patent Publication No. Hei-6-126453, calculation is performed in accordance with [Numerical formula 1], therefore, a problem has existed such that it is possible to determine a shape as shown in FIG. 2, but it is impossible to calculate, by the above numerical formula, a shape as shown in FIG. 3, which occurs in a case where a non-consumable electrode-type arc welding is performed and produces a recess or a shape as shown in FIG. 4, which produces undercuts on the flange side and web side. As the reasons thereof, when [Numerical formula 1] is used, an x-coordinate of a bead shape with respect to an y-coordinate is determined based on a certain initial value (x0, y0), therefore, for expressing the recess on the flange side of FIG. 3 and the undercut on the flange side of FIG. 4, multiple solutions occur, thus a unique solution cannot be determined by a numerical value calculation.

DISCLOSURE OF INVENTION

Therefore, it is an object of the present invention to provide, by solving the problem of multiple solutions when the shape causing a recess or undercut on the flange side is determined by calculation, a method for calculating the shape of a bead of a welded part which can easily represent a recess or undercut on the flange side to set an appropriate welding condition.

In order to achieve the above theme, a first aspect of the present invention is a method for calculating the shape of a bead of a welded part in arc welding comprising the steps of:
   setting geometric data on the object to be welded, characteristic parameters of the object and welding environment, and welding conditions,
   inferring, under the welding conditions, the melting part of the object by a heat conduction calculation,
   rotating the coordinates about an axis parallel to the direction of the welding and/or about an axis perpendicular to the welding direction for the calculated melting part,
   setting a difference lattice for the coordinate-rotated melting part,
   calculating displacement of the melting part, for which the difference lattice is set, by a curved surface equation,
   rotating the welding shape determined by the calculated displacement by the same angle of rotation as that of the coordinate rotation in the opposite direction to the rotation direction, and
   repeatedly calculating the inference of the melting part by the heat conduction calculation of the displacement shape, the coordinate rotation, the setting of the difference lattice, and the calculation of the displacement of the melting part until a calculation end criterion is met.

A second aspect of the present invention is a method for calculating the shape of a bead of a welded part in arc welding comprising the steps of:
   setting geometric data on the object to be welded, characteristic parameters of the object and welding environment, and welding conditions, rotating the coordinates about an axis parallel to the direction of the welding of the object and/or about an axis perpendicular to the weld line direction, inferring, based on preset welding conditions, the melting part of the object by a heat conduction calculation, setting a difference lattice for the melting part, calculating displacement of the melting part, for which the difference lattice is set, by a curved surface equation, repeatedly calculating the inference of the melting part by the heat conduction calculation of the displacement shape, the setting of the difference lattice, and the calculation of the displacement of the melting part until a calculation end criterion is met, and rotating the shape of the invariable melting part and displacement shape by the same angle of rotation as that of the coordinate rotation in the opposite direction to the rotation direction.

A third aspect of the present invention is a method for calculating the shape of a bead of a welded part in arc welding comprising the steps of:

setting geometric data on the object to be welded, characteristic parameters of the object and welding environment, and welding conditions, inferring, under the welding conditions, the melting part of the object by a heat conduction calculation, rotating the coordinates about an axis parallel to the direction of the welding and/or about an axis perpendicular to the welding direction for the calculated melting part, setting a difference lattice for the coordinate-rotated melting part, adding deposit metal by an amount determined based on the welding conditions to the melting part for which the difference lattice is set, calculating the displacement of the deposit metal by a curved surface equation, rotating the welding shape determined by the calculated displacement by the same angle of rotation as that of the coordinate rotation in the opposite direction to the rotation direction, and repeatedly calculating the inference of the melting part by the heat conduction calculation of the displacement shape, the coordinate rotation, the setting of the difference lattice, the addition of the deposit metal, and the calculation of the displacement of the deposit metal until a calculation end criterion is met.

A fourth aspect of the present invention is a method for calculating the shape of a bead of a welded part in arc welding comprising the steps of:

setting geometric data on the object to be welded, characteristic parameters of the object and welding environment, and welding conditions, rotating the coordinates about an axis parallel to the direction of the welding of the object and/or about an axis perpendicular to the weld line direction, inferring, based on preset welding conditions, the melting part of the object by a heat conduction calculation, setting a difference lattice for the melting part, adding deposit metal by an amount determined based on the welding conditions, calculating the displacement of the deposit metal, for which the difference lattice is set, by a curved surface equation, repeatedly calculating the inference of the melting part by the heat conduction calculation of the displacement shape, the setting of the difference lattice, the addition of the deposit metal amount and the calculation of the displacement of the melting part until a calculation end criterion is met, and rotating the shape of the invariable melting part and displacement shape by the same angle of rotation as that of the coordinate rotation in the opposite direction to the rotation direction.

In addition, in the above first through fourth aspects of the present invention, heat conduction calculation is calculated by a finite difference method or an analytic solution, or by preference from these methods.

Moreover, a calculation is carried out by using a finite difference method as a solution of a curved surface equation.

Furthermore, the calculation end criterion is that the shape of the melting part and/or the displacement shape does not vary or is within an allowable error, or the calculation end criterion is the number of calculations of the shape of the melting part and/or the displacement shape.

BEST MODE FOR CARRYING OUT THE INVENTION

Hereinafter, the first embodiment of the present invention will be described based on the drawings.

Figure 1:
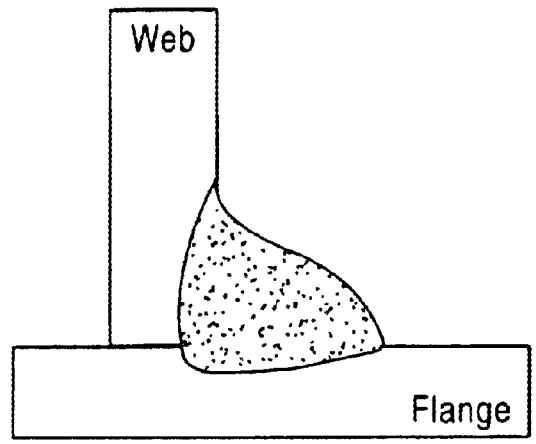
FIG. 1 is a sectional schematic view of typical fillet welding.
Figure 2:
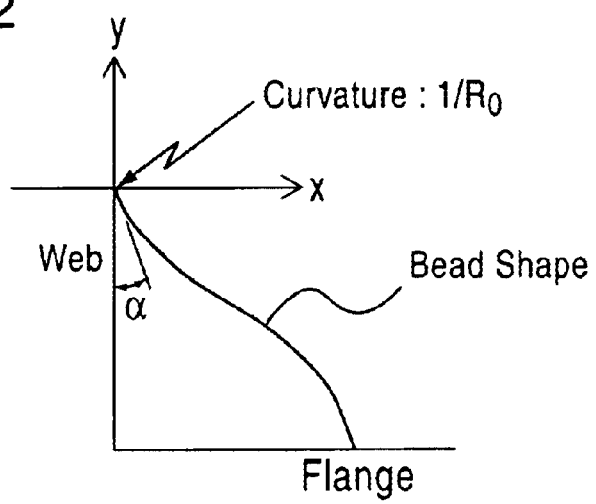
FIG. 2 is an explanatory diagram showing the shape of a bead surface according to the prior method.
Figure 3:
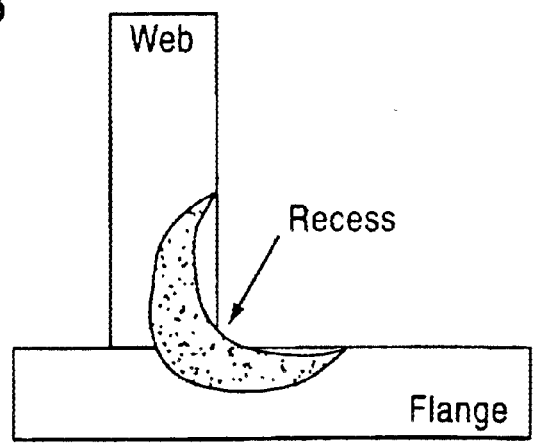
FIG. 3 is a sectional schematic view in a case where a recess has occurred extending over a flange and a web.
Figure 4:
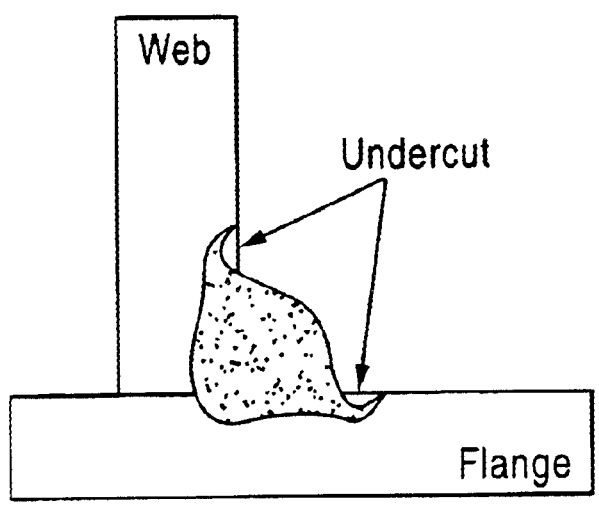
FIG. 4 is a sectional schematic view in a case where undercuts have occurred extending over a flange and a web.
Figure 5:
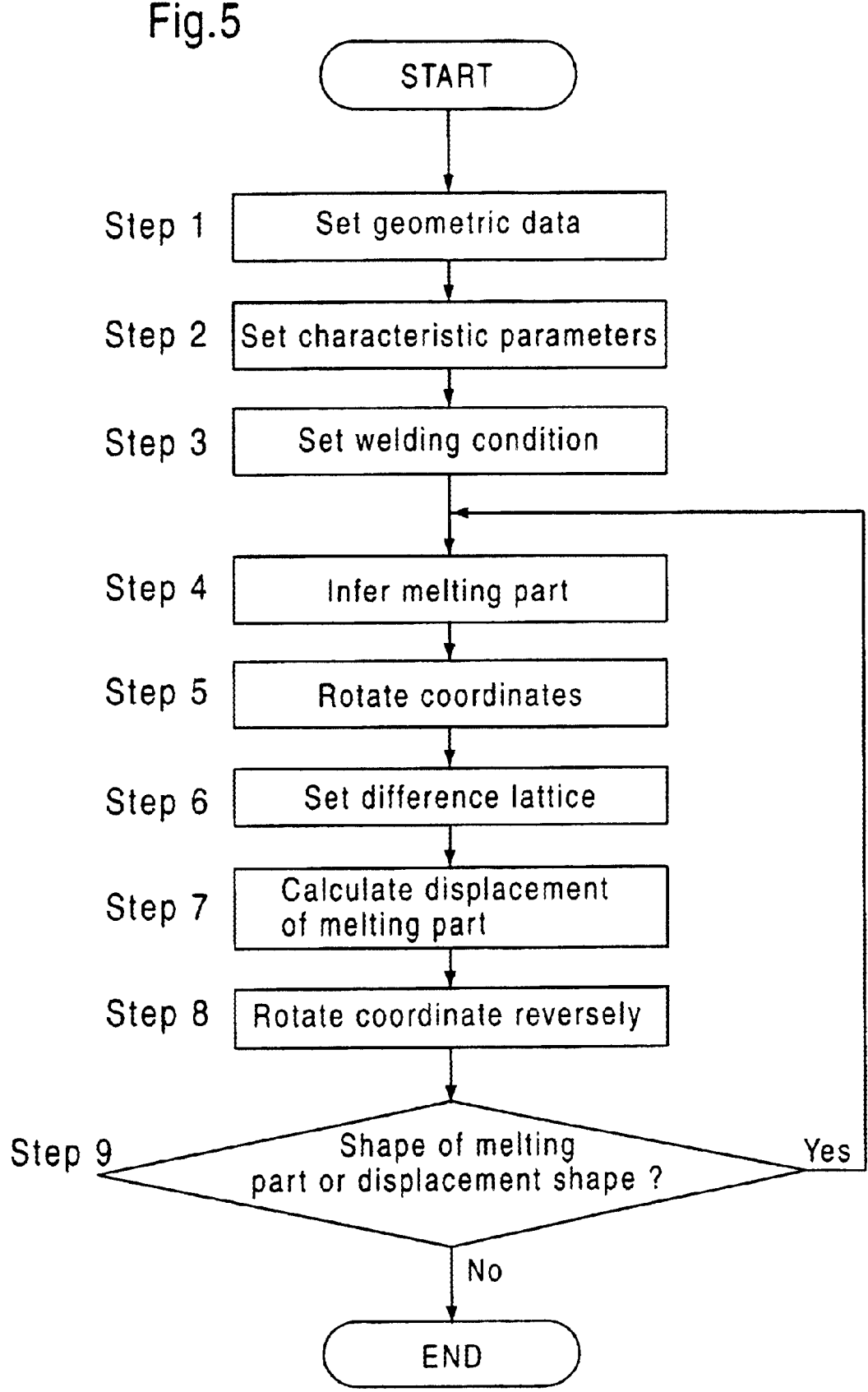
FIG. 5 is a flowchart in a case where the method according to a first embodiment of the present invention is used.

FIG. 5 shows a flowchart in a case where the method of the present invention is used.

In the geometric data setting of Step 1, numerical data on a joint shape as an object to be welded is set. For example, CAD data is converted to data suitable for calculation according to the present invention, or a numerical formula that expresses a joint shape in advance is used. FIG. 5 shows a schematic view of the set geometric data.

In the characteristic parameter setting of Step 2, parameters for determining heat conductivity, specific heat, density, latent heat, a melting point temperature, a transformation point and the like, which are characteristic values of materials, are set based on board thickness material, gaps between joints, and room temperature.

In the welding conditions setting of Step 3, the welding current, welding voltage, welding speed, torch target angle, torch lead angle, torch target position, electrode system, electrode tip angle, shielding gas type, distance between the electrode and base metal and the like are set.

In the melting part inference of Step 4, a heat conduction calculation is carried out based on the data set in Step 1 through Step 3, thereby extracting a temperature range equal to or higher than the melting point temperature. For this heat conduction calculation, a method is used such that a finite difference is determined by tailor-developing a nonlinear heat conduction equation or a linear heat conduction equation and a solution is determined by a finite difference method, or a solution is determined by an analytical solution of the heat conduction equation. In the present embodiment, a nonlinear heat conduction equation of [Numerical formula 2] is used.

[Numerical formula 2]

$$\frac{\partial}{\partial X}\left[K(T)\frac{\partial T}{\partial X}\right]+\frac{\partial}{\partial Y}\left[K(T)\frac{\partial T}{\partial Y}\right]+\frac{\partial}{\partial Z}\left[K(T)\frac{\partial T}{\partial Z}\right]=-c(T)\rho(T)v\frac{\partial T}{\partial X}$$

provided that K: heat conductivity, T: temperature, c: specific heat, $\rho$ density, and v: welding speed.

Figure 6:
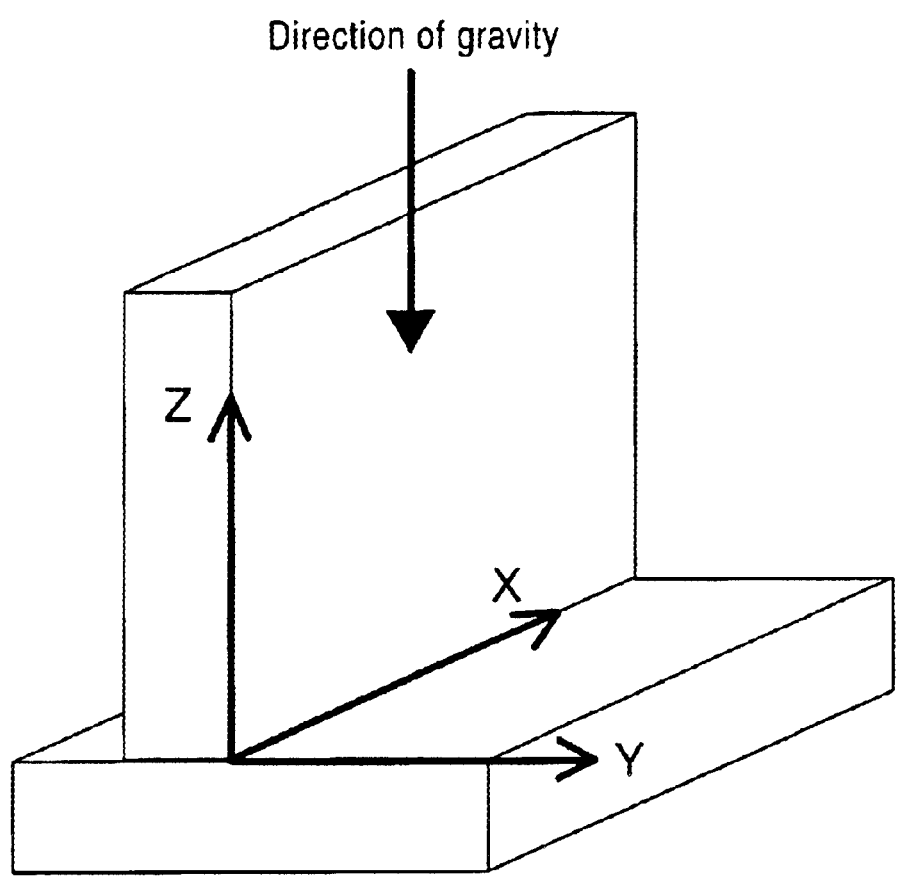
FIG. 6 is a schematic diagram of geometric data and a definition diagram of an X,Y,Z coordinate system.
Figure 7:
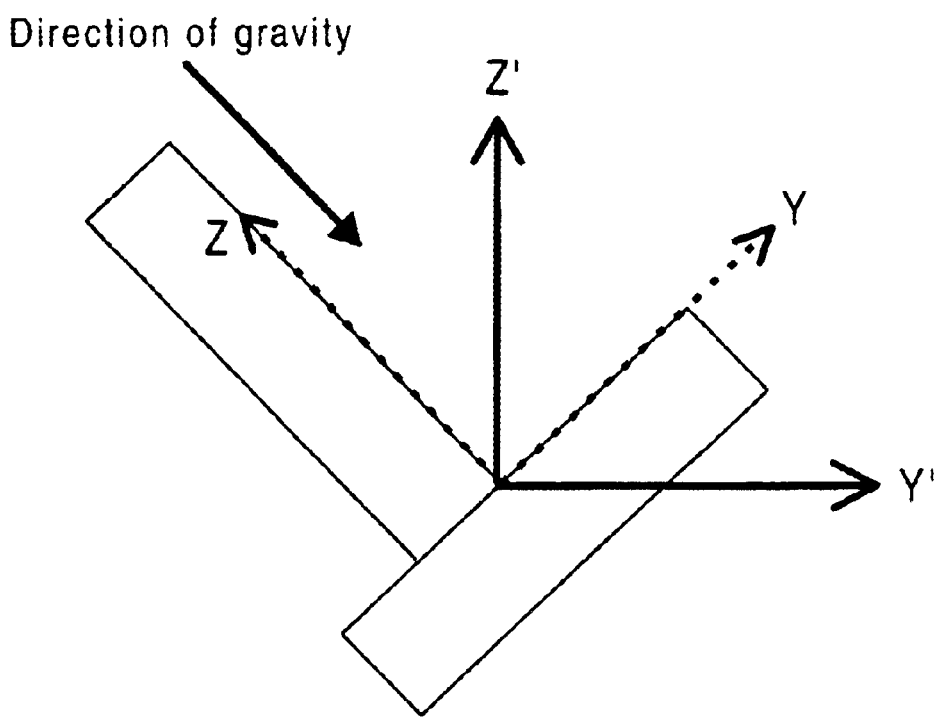
FIG. 7 is a schematic diagram of geometric data after a rotation of coordinates and a definition diagram of an X,Y',Z' coordinate system.

In the coordinate rotation of Step 5, coordinates are rotated about an x-axis of FIG. 6, thereby defining a new coordinate system of X,Y',Z' of FIG. 7. In the present embodiment, this coordinate system is rotated by 45°.

In Step 6, with respect to the melting part of Step 4 which has been coordinate-rotated in Step 5, a difference lattice is set by the X,Y',Z' coordinate system, which is a displacement calculation coordinate system for the melting part.

In calculation of displacement of the melting part of Step 7, a finite difference is determined by tailor-developing [Numerical formula 3] that expresses a curved surface equation, and displacement of a weld bead is calculated with the difference lattice set in Step 6 by a finite difference method.

[Numerical formula 3]

$$\sigma\left[\frac{\left\{1+\left(\frac{\partial Z'}{Y'}\right)^2\right\}\frac{\partial^2 Z'}{\partial X^2}-2\frac{\partial Z'}{\partial X}\frac{\partial Z'}{\partial Y'}\frac{\partial^2 Z'}{\partial X\partial Y'}+\left\{1+\left(\frac{\partial Z'}{\partial X}\right)^2\right\}\frac{\partial^2 Z'}{\partial Y'^2}}{\left\{1+\left(\frac{\partial Z'}{\partial X}\right)^2+\left(\frac{\partial Z'}{\partial Y'}\right)^2\right\}^{3/2}}\right]=$$

$$\rho g(Z'\cos\theta+Y\sin\theta)-Pa+\lambda$$

provided that $\theta$: angle of rotation about the x-axis, Pa: arc pressure, and $\lambda$: constant number.

In reverse coordinate rotation of Step 8, the displacement data of the weld bead calculated in Step 7 is rotated by an angle the same as that of coordinate rotation in Step 5 in a direction opposite to that of coordinate rotation in Step 5, whereby the coordinate system is returned to the coordinate system shown in FIG. 6.

In Step 9, the latest shape of the bead displacement determined by calculation and the shape of the bead displacement determined by the preceding calculation are compared and it is judged as to whether the error is within the range of a preset welding shape error. Furthermore, the latest shape of the bead displacement determined by calculation and the shape of the bead displacement determined by the preceding calculation are compared and it is judged as to whether the error is within the range of a preset displacement shape error.

Herein, if the welding shape error and bead displacement shape error are within the respective range of errors (convergence) or the number of loops has reached a preset upper limit, the process ends and if not, an inference calculation of the melting part of Step 4 is carried out based on the result after displacement calculation, and Step 4 through Step 9 are repeated until convergence is attained.

Figure 8:
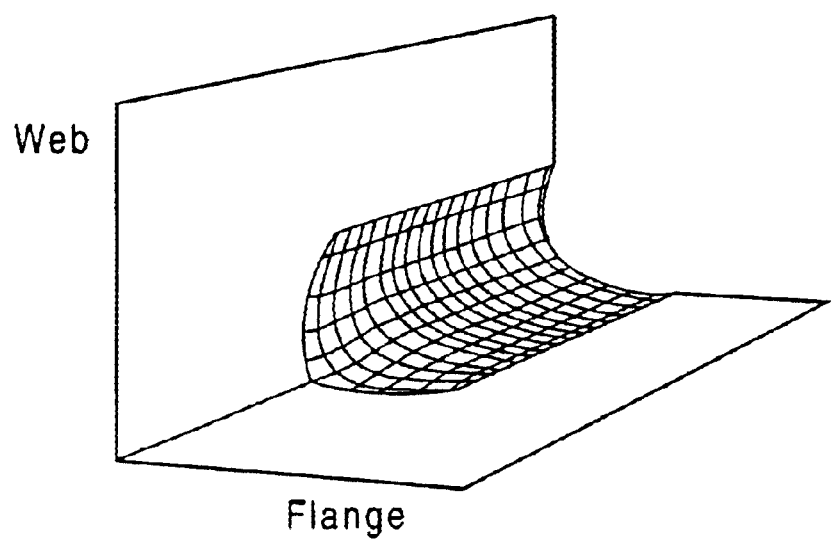
FIG. 8 is a simulation diagram showing a bead shape in a case where a recess has occurred over a flange and a web of a welded part calculated by the method according to the first and second embodiments.

FIG. 8 shows a bead shape of a welded part calculated by the method of the present invention, wherein it is understood that the portion of a recess which has occurred over a flange and a web is satisfactorily expressed, which has been impossible by the prior method.

Now, a second embodiment of the present invention will be described based on the drawings.

Figure 9:
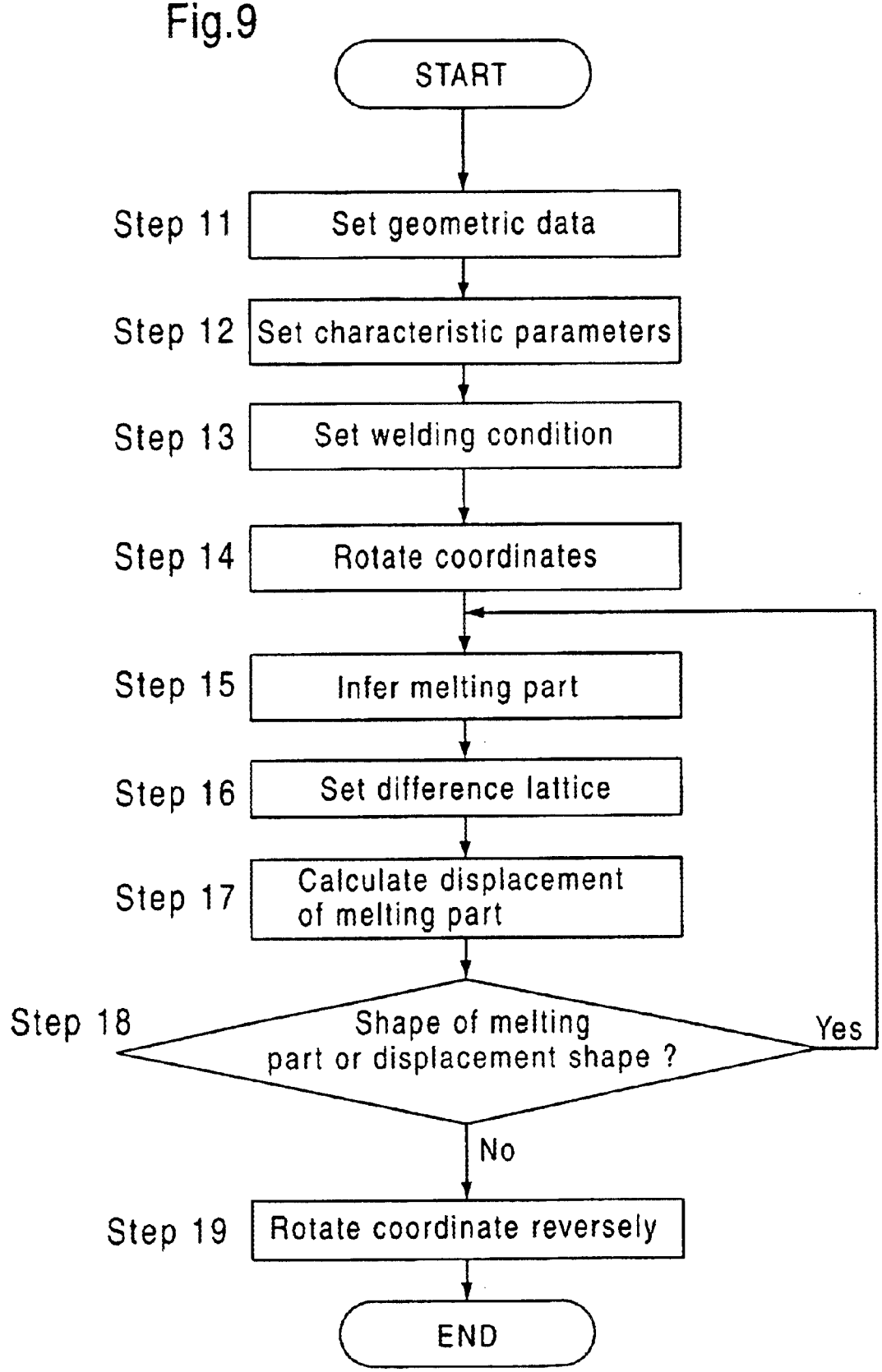
FIG. 9 is a flowchart in a case where the method according to a second embodiment of the present invention is used.

FIG. 9 shows a flowchart in a case where the method of the present invention is used.

In the geometric data setting of Step 11, numerical data on a joint shape as an object to be welded is set. For example, CAD data is converted to data suitable for calculation according to the present invention, or a numerical formula that expresses a joint shape in advance is used. For this, the geometric data set in the above-mentioned FIG. 6 is used.

In the characteristic parameter setting of Step 12, parameters for determining heat conductivity, specific heat, density, latent heat, a melting point temperature, a transformation point and the like, which are characteristic values of materials, are set based on board thickness, material, gaps between joints, and room temperature.

In the welding conditions setting of Step 13, the welding current, welding voltage, welding speed, torch target angle, torch lead angle, torch target position, electrode system, electrode tip angle, shielding gas type, distance between the electrode and base metal and the like are set.

In the coordinate rotation of Step 14, coordinates are rotated about an x-axis of FIG. 6, thereby defining a new coordinate system of X,Y',Z' of FIG. 7. In the present embodiment, this coordinate system is rotated by 45°.

In the melting part inference of Step 15, a heat conduction calculation is carried out based on the data set in Step 11 through Step 14, thereby extracting a temperature range equal to or higher than the melting point temperature. For this heat conduction calculation, a method is used such that a finite difference is determined by tailor-developing a nonlinear heat conduction equation or a linear heat conduction equation and a solution is determined by a finite difference method, or a solution is determined by an analytical solution of the heat conduction equation. In the present embodiment, a nonlinear heat conduction equation of the above-mentioned [Numerical formula 2] is used.

In Step 16, with respect to the melting part of Step 15, a difference lattice is set by the X,Y',Z' coordinate system, which is a displacement calculation coordinate system for the melting part.

In calculation of displacement of the melting part of Step 17, a finite difference is determined by tailor-developing the above-mentioned [Numerical formula 3] that expresses a curved surface equation, and displacement of a weld bead is calculated with the difference lattice set in Step 16 by a finite difference method.

In Step 18, the latest shape of the bead displacement determined by calculation and the shape of the bead displacement determined by the preceding calculation are compared and it is judged as to whether the error is within the range of a preset welding shape error. Furthermore, the latest shape of the bead displacement determined by calculation and the shape of the bead displacement determined by the preceding calculation are compared and it is judged as to whether the error is within the range of a preset displacement shape error.

Herein, if the welding shape error and bead displacement shape error are within the respective range of errors (convergence) or the number of loops has reached a preset upper limit, the process ends and if not, an inference calculation of the melting part of Step 15 is carried out based on the result after displacement calculation, and Step 15 through Step 18 are repeated until convergence is attained.

In reverse coordinate rotation of Step 19, the position data of the melting part calculated in Step 15 and displacement data of the weld bead calculated in Step 17 is rotated by an angle the same as that of coordinate rotation in Step 14 in a direction opposite to that of coordinate rotation in Step 14, whereby the coordinate system is returned to the coordinate system shown in FIG. 6.

The bead shape of a welded part calculated by this method of the second embodiment results in the shape shown in FIG. 8 cited before, and it is understood that the portion of a recess which has occurred over a flange and a web is satisfactorily expressed, which has been impossible by the prior method.

Now, a third embodiment of the present invention will be described based on the drawings.

Figure 10:
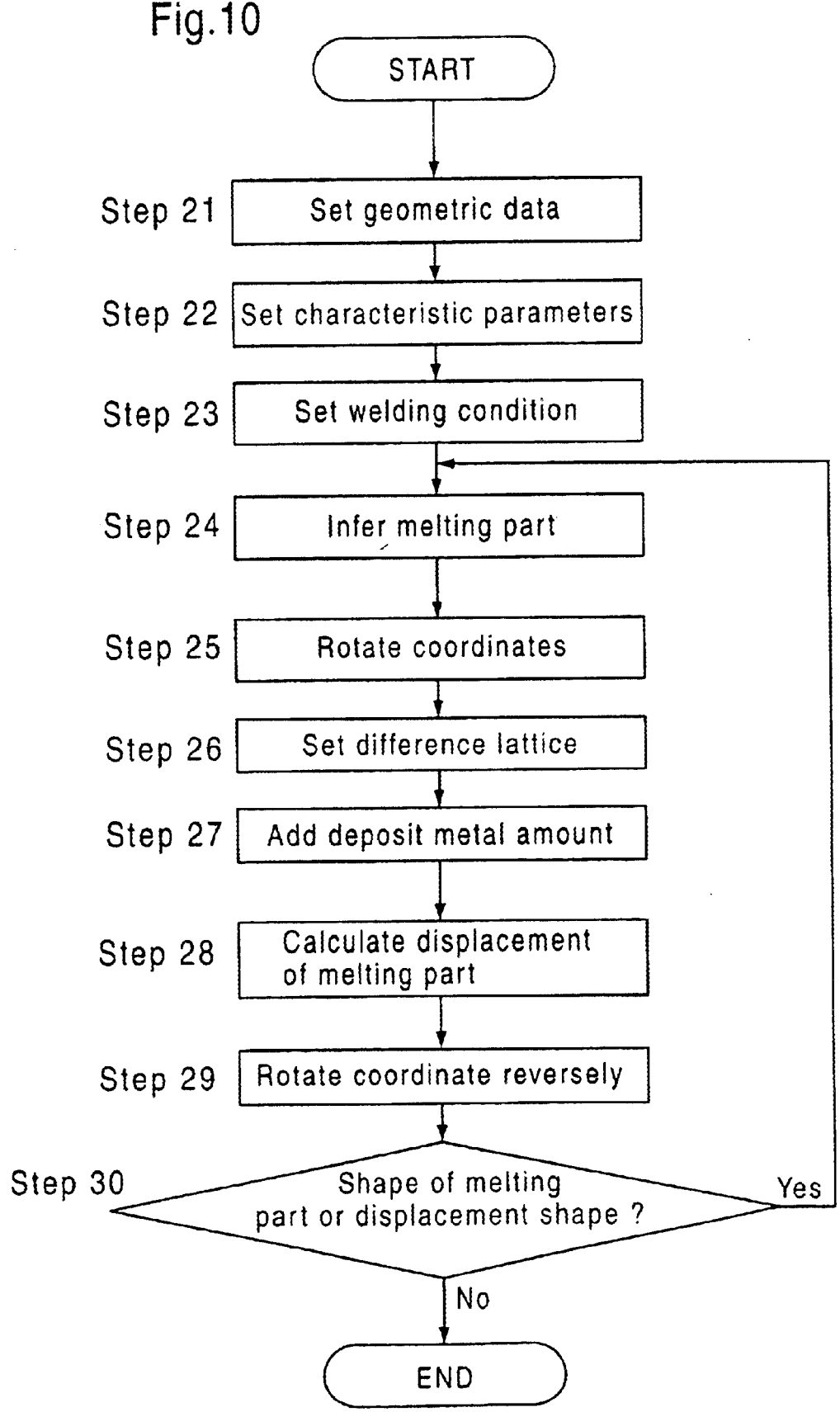
FIG. 10 is a flowchart in a case where the method according to a third embodiment of the present invention is used.

FIG. 10 shows a flowchart in a case where the method of the present invention is used.

In the geometric data setting of Step 21, numerical data on a joint shape as an object to be welded is set. For example, CAD data is converted to data suitable for calculation according to the present invention, or a numerical formula that expresses a joint shape in advance is used. A schematic diagram of the set geometric data is the same as the above-mentioned FIG. 6.

In the characteristic parameter setting of Step 22, parameters for determining heat conductivity, specific heat, density, latent heat, a melting point temperature, a transformation point and the like, which are characteristic values of materials, are set based on board thickness, material, gaps between joints, and room temperature.

In the welding conditions setting of Step 23, the welding current, welding voltage, welding speed, torch target angle, torch lead angle, torch target position, electrode system, electrode tip angle, shielding gas type, distance between the electrode and base metal and the like are set.

In the melting part inference of Step 24, a heat conduction calculation is carried out based on the data set in Step 21 through Step 23, thereby extracting a temperature range equal to or higher than the melting point temperature. For this heat conduction calculation, a method is used such that a finite difference is determined by tailor-developing a nonlinear heat conduction equation or a linear heat conduction equation and a solution is determined by a finite difference method, or a solution is determined by an analytical solution of the heat conduction equation. In the present embodiment, a nonlinear heat conduction equation of the above-mentioned [Numerical formula 2] is used.

In the coordinate rotation of Step 25, coordinates are rotated about an x-axis of FIG. 6, thereby defining a new coordinate system of X,Y',Z' of FIG. 7. In the present embodiment, this coordinate system is rotated by 45°.

In Step 26, with respect to the melting part of Step 24 which has been coordinate-rotated in Step 25, a difference lattice is set by the X,Y',Z' coordinate system, which is a displacement calculation coordinate system for the melting part.

The addition of a deposit metal amount of Step 27 can be determined by calculating the amount of deposit metal by generally known relational expressions between the melting rate and welding current/welding wire extension/welding wire diameter.

In calculation of displacement of the melting part of Step 28, a finite difference is determined by tailor-developing the above-mentioned [Numerical formula 3] that expresses a curved surface equation, and displacement of a weld bead is calculated with the difference lattice set in Step 6 by a finite difference method.

In reverse coordinate rotation of Step 29, the displacement data of the weld bead calculated in Step 27 is rotated by an angle the same as that of coordinate rotation in Step 25 in a direction opposite to that of coordinate rotation in Step 25, whereby the coordinate system is returned to the coordinate system shown in FIG. 6.

In Step 30, the latest shape of the melting part determined by calculation and the shape of the melting part determined by the preceding calculation are compared and it is judged as to whether the error is within the range of a preset welding shape error. Furthermore, the latest shape of the bead displacement determined by calculation and the shape of the bead displacement determined by the preceding calculation are compared and it is judged as to whether the error is within the range of a preset displacement shape error.

Herein, if the welding shape error and bead displacement shape error are within the respective range of errors (convergence) or the number of loops has reached a preset upper limit, the process ends and if not, an inference calculation of the melting part of Step 24 is carried out based on the result after displacement calculation, and Step 24 through Step 30 are repeated until convergence is attained.

Figure 11:
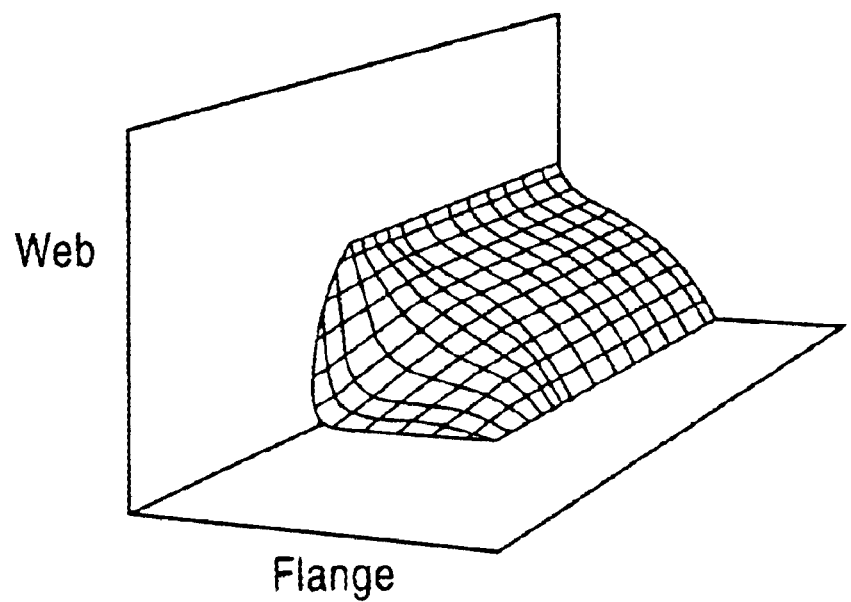
FIG. 11 is a simulation diagram showing a bead shape in a case where appropriate welding conditions calculated by the method according to the third and fourth embodiments are specified.
Figure 12:
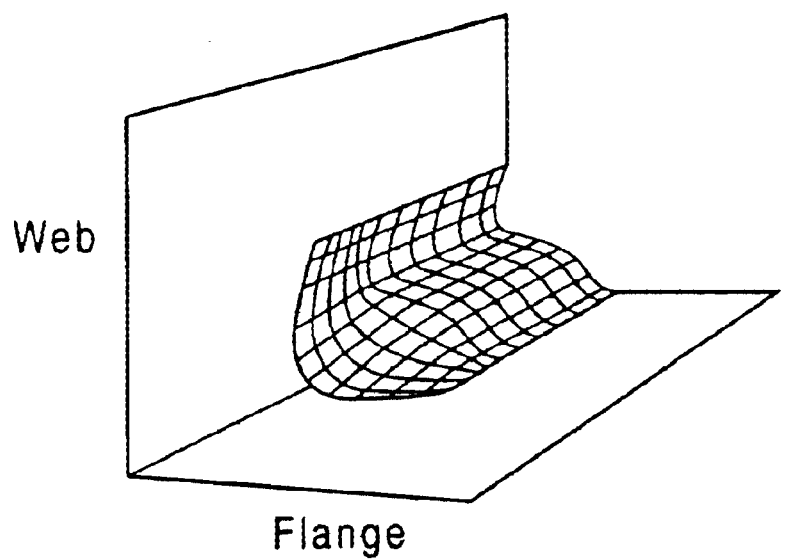
FIG. 12 is a simulation diagram showing a bead shape in a case where undercuts occur on the flange side and web side of a welded part calculated by the method according to the third and fourth embodiments.

FIG. 11 shows a bead shape of a welded part calculated by the method of the present invention, which indicates preferable results free of weld defects such as undercuts. Meanwhile, in FIG. 12 showing an example by the prior method, weld failures of undercuts have occurred on the flange side and on the web side, therefore it is understood that the portions to undercuts which have occurred on both flange and web sides are satisfactorily expressed, which has been impossible by the prior method.

Now, a fourth embodiment of the present invention will be described based on the drawings.

Figure 13:
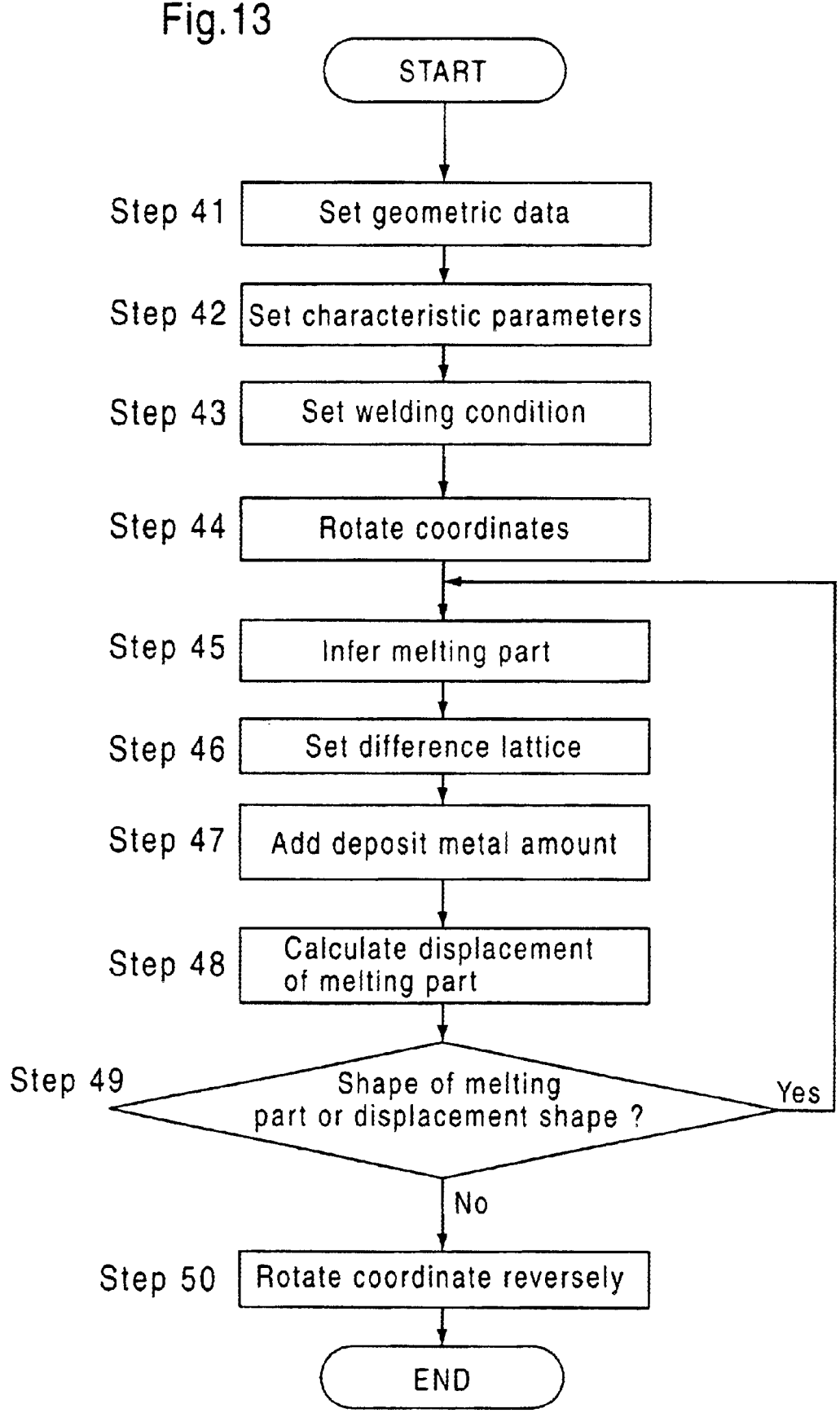
FIG. 13 is a flowchart in a case where the method according to the fourth embodiment is used.

FIG. 13 shows a flowchart in a case where the method of the present invention is used.

In the geometric data setting of Step 41, numerical data on a joint shape as an object to be welded is set. For example, CAD data is converted to data suitable for calculation according to the present invention, or a numerical formula that expresses a joint shape in advance is used. A schematic diagram of the set geometric data is the same as that shown in the above-mentioned FIG. 6.

In the characteristic parameter setting of Step 42, parameters for determining heat conductivity, specific heat, density, latent heat, a melting point temperature, a transformation point and the like, which are characteristic values of materials, are set based on board thickness, material, gaps between joints, and room temperature.

In the welding conditions setting of Step 43, the welding current, welding voltage, welding speed, torch target angle, torch lead angle, torch target position, electrode system, electrode tip angle, shielding gas type, distance between the electrode and base metal and the like are set.

In the melting part inference of Step 45, a heat conduction calculation is carried out based on the data set in Step 41 through Step 44, thereby extracting a temperature range equal to or higher than the melting point temperature. For this heat conduction calculation, a method is used such that a finite difference is determined by tailor-developing a nonlinear heat conduction equation or a linear heat conduction equation and a solution is determined by a finite difference method, or a solution is determined by an analytical solution of the heat conduction equation. In the present embodiment, a nonlinear heat conduction equation of the above-mentioned [Numerical formula 2] is used.

In the coordinate rotation of Step 44, coordinates are rotated about an x-axis of FIG. 6, thereby defining a new coordinate system of X,Y',Z' of FIG. 7. In the present embodiment, this coordinate system is rotated by 45°.

In Step 46, with respect to the melting part, which has been coordinate-rotated in Step 44 and calculated in Step 45, a difference lattice is set by the X,Y',Z' coordinate system, which is a displacement calculation coordinate system for the melting part.

The addition of a deposit metal amount of Step 47 can be determined by calculating the amount of deposit metal by generally known relational expressions between the melting rate and welding current/welding wire extension/welding wire diameter.

In calculation of displacement of the melting part of Step 48, a finite difference is determined by tailor-developing the above-mentioned [Numerical formula 3] that expresses a curved surface equation, and displacement of a weld bead is calculated with the difference lattice set in Step 46 by a finite difference method.

In reverse coordinate rotation of Step 50, the position data of the melting part calculated in Step 45 and displacement data of the weld bead calculated in Step 48 is rotated by an angle the same as that of coordinate rotation in Step 44 in a direction opposite to that of coordinate rotation in Step 44, whereby the coordinate system is returned to the coordinate system shown in FIG. 6.

In Step 49, the latest shape of the melting part determined by calculation and the shape of the melting part determined by the preceding calculation are compared and it is judged as to whether the error is within the range of a preset welding shape error. Furthermore, the latest shape of the bead displacement determined by calculation and the shape of the bead displacement determined by the preceding calculation are compared and it is judged as to whether the error is within the range of a preset displacement shape error.

Herein, if the welding shape error and bead displacement shape error are within the respective range of errors (convergence) or the number of loops has reached a preset upper limit, the process ends and if not, an inference calculation of the melting part of Step 45 is carried out based on the result after displacement calculation, and Step 45 through Step 49 are repeated until convergence is attained.

The bead shape of a welded part calculated by the method of the present invention is the same as FIG. 11, which indicates preferable results free of weld defects such as undercuts. Meanwhile, by the prior method, as shown in FIG. 12, weld failures of undercuts have occurred on the flange side and on the web side, therefore, it is understood that the portions of undercuts which have occurred on both flange and web sides are satisfactorily expressed, which had been impossible by the prior method.

As has been described above, according to the present invention, the following effects are provided.

(1) By repeatedly carrying out a heat conduction calculation and bead displacement calculation, the surface shape and penetration shape of a bead can be evaluated before welding is actually performed, therefore, compared to the method wherein welding conditions are set based on actual welding, compatibility with improvements in working efficiency and reductions in cost can be realized.

(2) Furthermore, the calculation method employs a heat conduction calculation in combination with bead displacement calculation, therefore, it is possible to accurately infer the bead shape as a welding result.

(3) Moreover, coordinate rotation is carried out when bead displacement calculation is performed, therefore, reliable inference calculation of a recess extending over a flange and a web becomes possible, which had been impossible by the prior art.

INDUSTRIAL APPLICABILITY

The present invention is advantageous as a method for accurately calculating numerical values of a bead shape for arc welding.

What is claimed is:

1. A method for calculating the shape of a bead of a welded part in arc welding comprising the steps of:

setting geometric data including coordinates on the object to be welded, characteristic parameters of the object and welding environment, and welding conditions, inferring, under the welding conditions, the melting part of the object by a heat conduction calculation, rotating the coordinates about an axis parallel to the direction of the welding and/or about an axis perpendicular to the welding direction for the melting part, setting a difference lattice for the coordinate-rotated melting part, adding deposit metal by an amount determined based on the welding conditions to the melting part for which the difference lattice is set, calculating the displacement of the deposit metal by a curved surface equation, rotating the welding shape determined by the calculated displacement by the same angle of rotation as that of the coordinate rotation in the opposite direction to the rotation direction, and repeatedly calculating the inference of the melting part by the heat conduction calculation of the displacement shape, the coordinate rotation, the setting of the difference lattice, the addition of the deposit metal amount, and the calculation of the displacement of the deposit metal until a calculation end criterion is met.

2. A method for calculating the shape of a bead of a welded part in arc welding comprising the steps of:

setting geometric data including coordinates on the object to be welded, characteristic parameters of the object and welding environment, and welding conditions, rotating the coordinates about an axis parallel to the direction of the welding of the object and/or about an axis perpendicular to the weld line direction, inferring, based on preset welding conditions, the melting part of the object by a heat conduction calculation, setting a difference lattice for the melting part, adding deposit metal by an amount determined based on the welding conditions, calculating the displacement of the deposit metal, for which the difference lattice is set, by a curved surface equation, repeatedly calculating the inference of the melting part by the heat conduction calculation of the displacement shape, the setting of the difference lattice, the addition of the deposit metal amount and the calculation of the displacement of the melting part until a calculation end criterion is met, and rotating the shape of the melting part and displacement shape by the same angle of rotation as that of the coordinate rotation in the opposite direction to the rotation direction.

3. A method for calculating the shape of a bead of a welded part as set forth in any of claim 1 or claim 2, wherein a heat conduction calculation is calculated by a finite difference method.

4. A method for calculating the shape of a bead of a welded part as set forth in any of claim 1 or claim 2, wherein a heat conduction calculation is calculated by an analytic solution of a heat conduction equation.

5. A method for calculating the shape of a bead of a welded part as set forth in any of claim 1 or claim 2, wherein a heat conduction calculation is calculated by freely selecting an analytic solution of a heat conduction equation or a finite difference method.

6. A method for calculating the shape of a bead of a welded part as set forth in any of claim 1 or claim 2, wherein a calculation is carried out by using a finite difference method as a solution of a curved surface equation.

7. A method for calculating the shape of a bead of a welded part as set forth in any of claim 1 or claim 2, wherein the calculation end criterion is that the shape of the melting part and/or the displacement shape does not vary or is within an allowable error range.

8. A method for calculating the shape of a bead of a welded part as set forth in any of claim 1 or claim 2, wherein the calculation end criterion is the number of calculations of the shape of the melting part and/or the displacement shape.

* * * * *